(12) United States Patent
Peng et al.

(10) Patent No.: US 12,510,447 B2
(45) Date of Patent: Dec. 30, 2025

(54) TESTING DEVICE AND METHOD FOR SIMULATING COALBUMP OF PASSING THROUGH FAULT

(71) Applicant: Chongqing University, Chongqing (CN)

(72) Inventors: Shoujian Peng, Chongqing (CN); Jiang Xu, Chongqing (CN); Qingfeng Xu, Chongqing (CN); Liang Cheng, Chongqing (CN); Li Jia, Chongqing (CN); Bin Zhou, Chongqing (CN); Yi'an Chen, Chongqing (CN); Feng Jiao, Chongqing (CN); Yan Yang, Chongqing (CN); Hailin Yang, Chongqing (CN); Qingqing Gan, Chongqing (CN); Xiaomei Wang, Chongqing (CN)

(73) Assignee: Chongqing University, Shapingba (CN)

( * ) Notice: Subject to any disclaimer, the term of this patent is extended or adjusted under 35 U.S.C. 154(b) by 348 days.

(21) Appl. No.: 18/084,181

(22) Filed: Dec. 19, 2022

(65) Prior Publication Data

US 2023/0408385 A1 Dec. 21, 2023

(30) Foreign Application Priority Data

Jun. 17, 2022 (CN) .......................... 202210690774.6

(51) Int. Cl.
*G01N 3/02* (2006.01)
*G01N 3/24* (2006.01)

(52) U.S. Cl.
CPC ................ *G01N 3/02* (2013.01); *G01N 3/24* (2013.01); *G01N 2203/0025* (2013.01);
(Continued)

(58) Field of Classification Search
CPC .... G01N 3/02; G01N 3/24; G01N 2203/0025; G01N 2203/0067; G01N 2203/0075;
(Continued)

(56) References Cited

U.S. PATENT DOCUMENTS

2015/0168282 A1* 6/2015 He .......................... G01N 3/24
73/841
2018/0313727 A1* 11/2018 Feng ........................ G01N 3/12

FOREIGN PATENT DOCUMENTS

CN 106289995 A * 1/2017 ............... G01N 3/02
CN 106644744 A * 5/2017
(Continued)

OTHER PUBLICATIONS

CN-106289995-A (Year: 2017).*
(Continued)

*Primary Examiner* — Fatemeh Esfandiari Nia
(74) *Attorney, Agent, or Firm* — Bay State IP, LLC

(57) ABSTRACT

A testing device for simulating coalbump includes a testing chamber. A first oil cylinder, a second oil cylinder and a third oil cylinder are provided within the testing chamber; each piston rod of each oil cylinder can stretch or retract. A first reaction seat, a second reaction seat and a third reaction seat are arranged opposite to a side of the first piston rod of the first oil cylinder, a side of the second piston rod of the second oil cylinder and a side of the third piston rod of the third oil cylinder respectively. The testing device includes a shear loading unit including a fourth oil cylinder and a fifth oil cylinder located on a same axis, and a side of a fourth piston rod of the fourth oil cylinder and a side of a fifth piston rod of the fifth oil cylinder are arranged opposite to each other.

5 Claims, 3 Drawing Sheets

(52) U.S. Cl.
CPC .............. *G01N 2203/0067* (2013.01); *G01N 2203/0075* (2013.01); *G01N 2203/025* (2013.01); *G01N 2203/0676* (2013.01)

(58) Field of Classification Search
CPC ..... G01N 2203/025; G01N 2203/0676; G01N 3/307; G01N 3/04; Y02A 10/23
See application file for complete search history.

(56) References Cited

FOREIGN PATENT DOCUMENTS

| | | | | | |
|---|---|---|---|---|---|
| CN | 110243701 | A | * | 9/2019 | ............... G01N 3/02 |
| CN | 112781956 | A | * | 5/2021 | ............... G01N 1/28 |

OTHER PUBLICATIONS

CN-106644744-A (Year: 2017).*
CN-110243701-A (Year: 2019).*
CN-112781956-A (Year: 2021).*

* cited by examiner

TESTING DEVICE AND METHOD FOR SIMULATING COALBUMP OF PASSING THROUGH FAULT

CROSS-REFERENCE TO RELATED APPLICATION

This application claims priority to Chinese Patent Application No. 202210690774.6, filed on Jun. 17, 2022, which is hereby incorporated by reference in its entirety.

TECHNICAL FIELD

The present disclosure relates to the technical field of mines, particularly to a testing device and method for simulating coalbump of passing through fault.

BACKGROUND

Coalbump is a common dynamic disaster phenomenon in coal mine production and a major problem to be solved urgently in the mining industry. In complex geological structures such as faults and folds, coalbump frequently occurs due to stress concentration and severe strata behavior during mining. It is significant to carry out experimental research on the influence of faults and folds on coalbump. Coalbump of passing through fault is a phenomenon of rock burst caused by unstable sliding of the fault resulted from mining stress and release of concentrated stress near the fault, the stress concentration near the fault provides stress conditions for the fault coalbump and discontinuous structure of the fault provides geological structure conditions for the fault coalbump. The testing device in the prior art for simulating coalbump includes oil cylinders with piston rods along X, Y, and Z directions respectively. Pressure is applied onto a cube test specimen by hydraulic pressure of the oil cylinder to simulate ground stress. However, the testing device in the prior art cannot generate shearing force on the test specimen, resulting in that a physical simulation test of coalbump cannot be carried out under the condition of disturbed shear dynamic load caused by fault dislocation.

SUMMARY

An object of the present disclosure is to provide a testing device and method for simulating coalbump of passing through fault, aiming at a problem that the existing testing device for simulating coalbump cannot generate shearing force on a test specimen so that a physical simulation test of coalbump cannot be carried out under the condition of disturbed shear dynamic load caused by fault dislocation.

According to the first aspect of the present disclosure, the present disclosure provides a testing device for simulating coalbump of passing through fault. The technical solution of the testing device is provided as follows.

The testing device includes a testing chamber; a first oil cylinder, a second oil cylinder and a third oil cylinder are provided within the testing chamber; a first piston rod of the first oil cylinder, a second piston rod of the second oil cylinder and a third piston rod of the third oil cylinder stretch or retract respectively in an X direction, a Y direction and a Z direction; a first reaction seat, a second reaction seat and a third reaction seat are arranged opposite to a side of the first piston rod of the first oil cylinder, a side of the second piston rod of the second oil cylinder and a side of the third piston rod of the third piston rod respectively, and provided within the testing chamber. The testing device further includes a shear loading unit including a fourth oil cylinder and a fifth oil cylinder. The fourth oil cylinder and the fifth oil cylinder are located on a same axis, and a side of a fourth piston rod of the fourth oil cylinder and a side of a fifth piston rod of the fifth oil cylinder are arranged opposite to each other; the fourth piston rod of the fourth oil cylinder and the fifth piston rod of the fifth oil cylinder stretch or retract along the X direction, Y direction or Z direction.

Further, the testing chamber includes a fixed seat and a test specimen carrier for loading a cuboid test specimen, the fixed seat is of hexahedral structure, a space for accommodating the test specimen carrier is formed inside the fixed seat, and an inlet-outlet opening for entrance and exit of the test specimen carrier is formed on a surface of the fixed seat. The first oil cylinder is arranged on the test specimen carrier and located at an end of a length direction of the test specimen. The second oil cylinder, the third oil cylinder, the fourth oil cylinder, the fifth oil cylinder, the first reaction seat, the second reaction seat and the third reaction seat are all arranged on the fixed seat. The axis of the fourth oil cylinder and the fifth oil cylinder is along the Z direction, and the shear loading unit formed by the fourth oil cylinder and the fifth oil cylinder is arranged in parallel with the third oil cylinder; two second oil cylinders and two second reaction seats are, and six surfaces of the test specimen are covered with pressure bearing plates respectively. Conveying the test specimen out of or into a loading operation area by the test specimen carrier saves labor force.

Further, two first guide rails arranged in parallel for movement of the test specimen carrier are provided outside the inlet-outlet opening, and the two first guide rails are supported and fixed by a support frame. The test specimen carrier conveys the test specimen through the first guide rails, which ensures positioning precision of the test specimen.

Further, the test specimen carrier is of hexahedral structure, a test specimen loading space for accommodating the test specimen is provided through the test specimen carrier, a loading and unloading opening for loading and unloading the test specimen is provided on a surface of the test specimen carrier and arranged horizontally. The first oil cylinder is arranged on a side wall of the test specimen loading space far from the fixed seat; upper and lower side walls of the test specimen loading space are provided with through slots, and cushion blocks for transferring loading load or reaction force are slidably fitted in the through slots.

Further, the test specimen is loaded on the test specimen carrier through a test specimen preparation platform, and two second guide rails arranged in parallel for movement of the test specimen preparation platform are provided on the test specimen carrier; extension guide rails are provided outside the loading and unloading opening and form extension portions of the second guide rails. The extension guide rails are provided on a loading platform, which is not convenient for the test specimen to be directly placed into the test specimen carrier; however, placing the test specimen on the test specimen preparation platform and then transferring it into the test specimen carrier makes loading more convenient and much faster.

Further, the loading platform includes a test specimen preparation platform base, and four columns are provided on the test specimen preparation platform base. Each of the extension guide rails is fixed on two corresponding columns by two semicircular hoops and screws. The test specimen preparation platform is of " □ " shaped frame structure, and two hollow areas of the test specimen preparation platform form an avoidance space for avoiding the cushion blocks; a pressure bearing plate is arranged between the test specimen preparation platform and the test specimen. The extension guide rails are fixed firmly, and stable and reliable in structure; furthermore, because of designing the test specimen preparation platform with a "H" shaped frame structure, it is no necessary to unload the test specimen from the test specimen preparation platform, and the test specimen preparation platform and the test specimen enter the fixed seat together with the test specimen carrier, which is convenient and quick.

Further, each of piston rods of the first oil cylinder, the second oil cylinder, the third oil cylinder the fourth oil cylinder and the fifth oil cylinder is provided with a stress sensor and a displacement sensor. Change data of stress and displacement is collected from the surface of the test specimen during a process from loading of the oil cylinder to occurrence of rock bust, for subsequent analysis.

Further, the testing device further includes a monitoring system for detecting cracks in the test specimen, and the monitoring system includes an ultrasonic detection system, a thermal imaging detection system, an electromagnetic radiation detection system, a high-speed camera, a borehole imager, and a dynamic strain gauge, which are used for detecting whether the cracks occur in the test specimen during loading, positions where the cracks occur, extension directions and so on.

According to a second aspect of the present disclosure, the present disclosure provides a testing method for simulating coalbump by adopting the testing device. The testing method includes the following steps:

S1, mounting a test specimen: mounting a prepared cuboid test specimen into place;

S2, preliminary loading: synchronously loading the first oil cylinder (1), the second oil cylinder (2), the third oil cylinder (3), the fourth oil cylinder (4) and the fifth oil cylinder (5) to a first loading force, to clamp the test specimen by collaborating with the first reaction seat (6), the second reaction seat (7) and the third reaction seat (8);

S3, fixing the test specimen: further loading all oil cylinders synchronously along a direction of the fourth piston rod of the fourth oil cylinder (4) to a second loading force, so as to further fasten the test specimen;

S4, preloading: loading the first oil cylinder, the second oil cylinder, the third oil cylinder, the fourth oil cylinder and the fifth oil cylinder synchronously to respective target preloading forces on conditions that first target preloading forces of the fourth oil cylinder (4) and the fifth oil cylinder (5) are less than second target preloading forces of the first oil cylinder (1), the second oil cylinder (2) and the third oil cylinder (3);

S5, keeping pressure stable: keeping pressure in a stable state for a period of time, after each oil cylinder reaches its target preloading force;

S6, shearing test: keeping the second target preloading forces of the first oil cylinder (1), the second oil cylinder (2) and the third oil cylinder (3) stable, and controlling piston rods of the fourth oil cylinder (4) and the fifth oil cylinder (5) to move synchronously in a same direction until the test specimen is broken;

S7, unloading and removing the test specimen: removing the test specimen and ending the test.

In the present disclosure employing the above technical solutions, by newly providing a pair of coaxial oil cylinders on the basis of the existing testing device, on the premise that the loading force applied on the test specimen by other oil cylinders is kept stable, the piston rods of the newly provided pair of oil cylinders are controlled to clamp the test specimen and move in the same direction synchronously, so as to generate shear force on the test specimen. Compared with the problem that the existing testing device for simulating coalbump cannot generate shearing force on the test specimen so that the physical simulation test of coalbump cannot be carried out under the condition of disturbed shear dynamic load caused by fault dislocation, in the present disclosure, the shearing force can be generated on the test specimen so that the physical simulation test of coalbump can be carried out under the condition of disturbed shear dynamic load caused by fault dislocation.

Compared with the prior art, the present disclosure has the following technical effects. 1. The shearing force can be generated on the test specimen so that the physical simulation test of coalbump can be carried out under the condition of disturbed shear dynamic load caused by fault dislocation. 2. It is convenient and quick to load materials through the test specimen preparation platform and the test specimen carrier, saving workforce.

Figure 1:
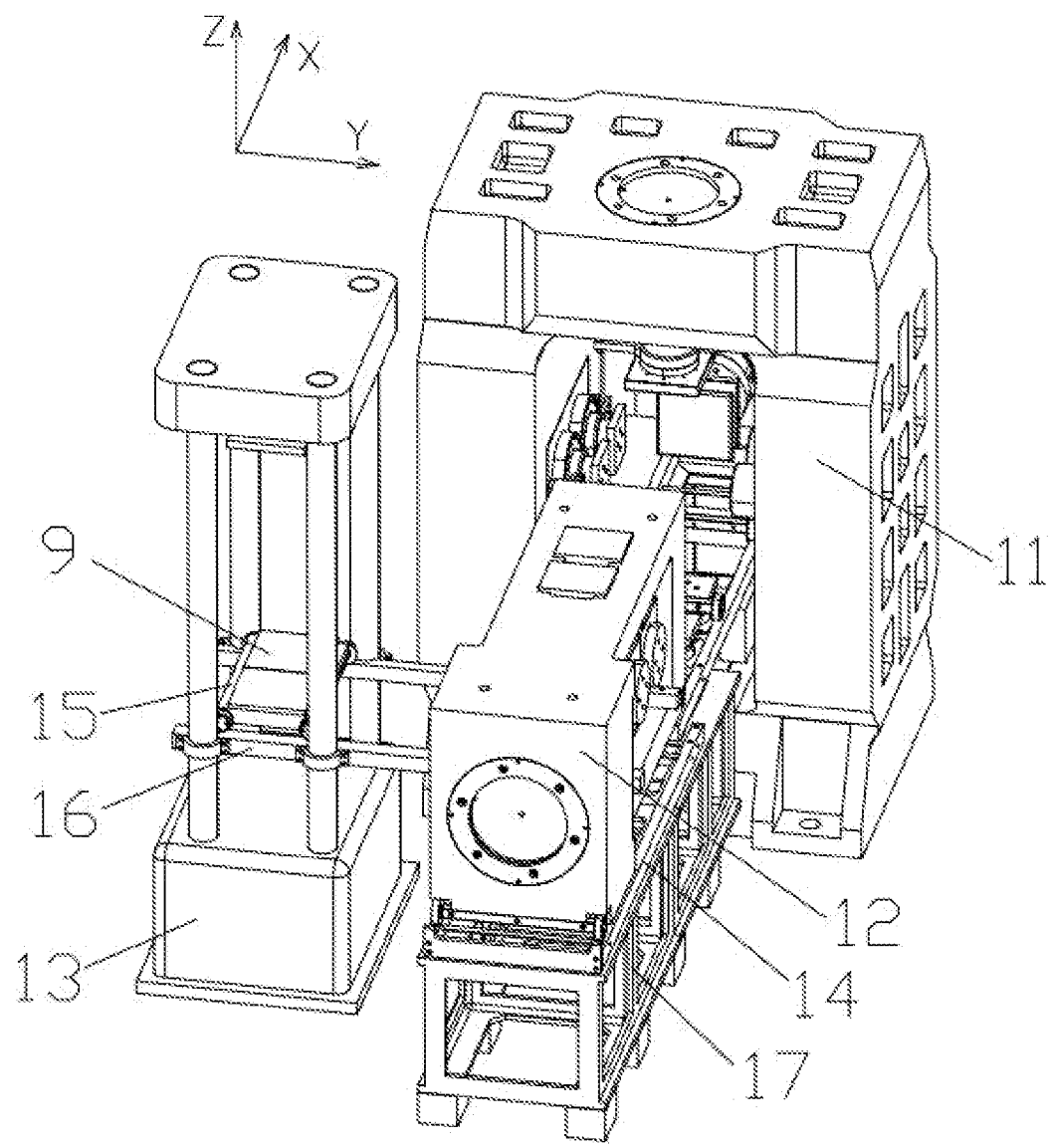
FIG. 1 is a schematic structural diagram of the present disclosure.

REFERENCE NUMERALS 1 first oil cylinder, 2 second oil cylinder, 3 third oil cylinder, 4 fourth oil cylinder, 5 fifth oil cylinder, 6 first reaction seat, 7 second reaction seat, 8 third reaction seat, 9 pressure bearing plate, 10 cushion block, 11 fixed seat, 12 test specimen carrier, 13 test specimen preparation platform base, 14 first guide rail, 15 test specimen preparation platform, 16 extension guide rail, 17 support frame, 18 second guide rail.

DETAILED DESCRIPTION OF THE EMBODIMENTS

The present disclosure will be described in detail in combination with the accompanying drawings.

In order to make the objects, the technical solutions and the advantages of the present disclosure much clearer, the present disclosure is further described in detail below in combination with the drawings and embodiments. It should be understood the specific embodiments described herein are only used to explain the present disclosure, not to limit the present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Figure 2:
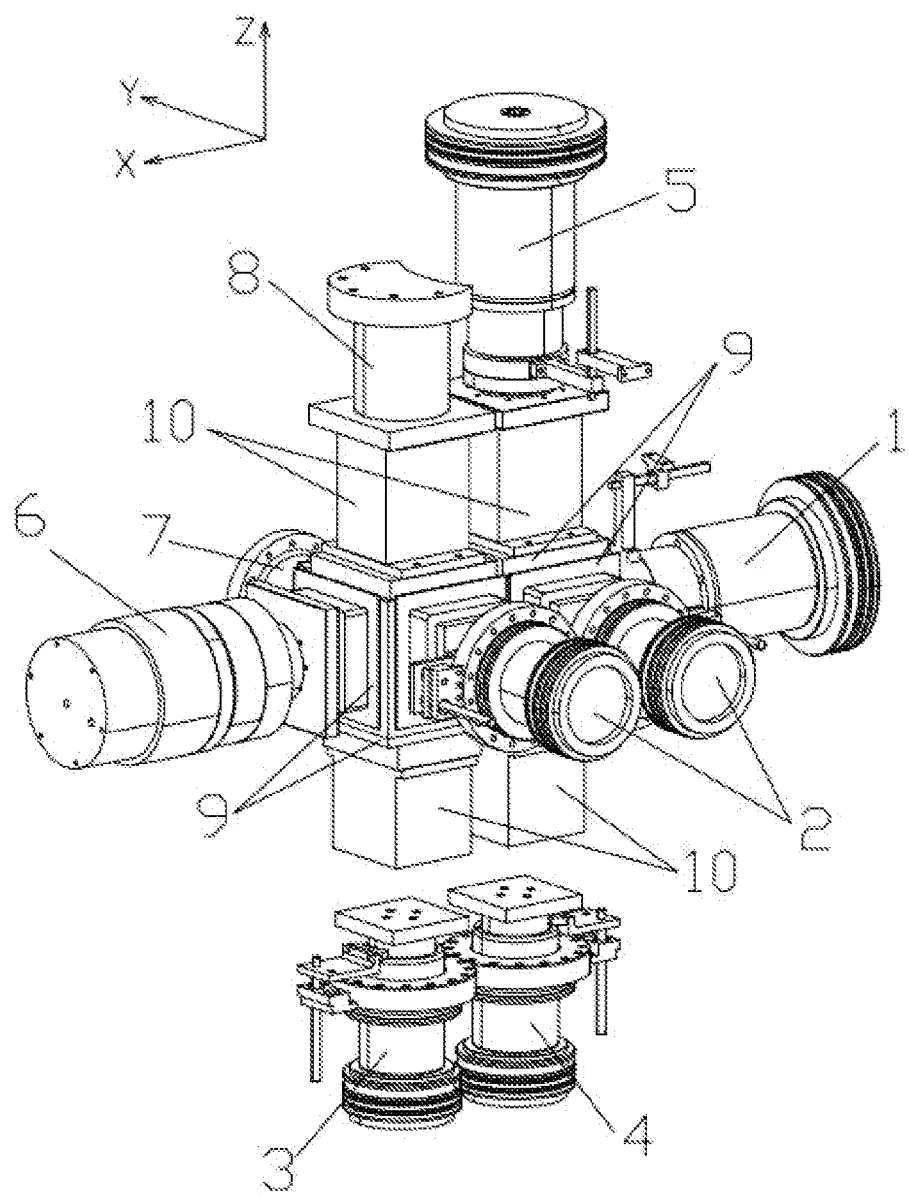
FIG. 2 is a schematic diagram showing a test specimen when it is loaded.
Figure 3:
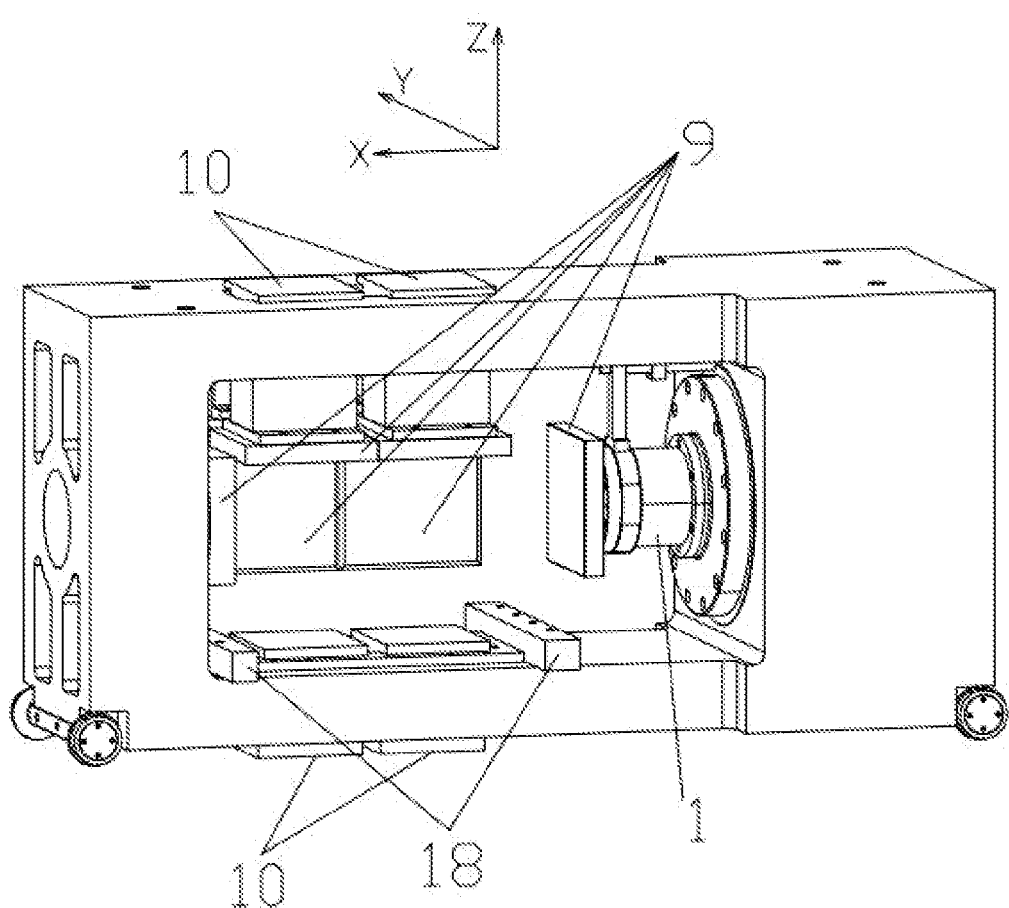
FIG. 3 is a schematic structural diagram of a test specimen carrier.

An embodiment of the present disclosure provides a testing device for simulating coalbump. As shown in FIGS. 1-3, the testing device includes a testing chamber, which is provided with a first oil cylinder 1, a second oil cylinder 2 and a third oil cylinder 3 therein. A first piston rod of the first oil cylinder 1, a second piston rod of the second oil cylinder 2 and a third piston rod of the third oil cylinder 3 stretch or retract in X, Y and Z directions respectively. A first reaction seat 6, a second reaction seat 7 and a third reaction seat 8 arranged opposite to a side of the first oil cylinder 1 having the first piston rod arranged thereon, a side of the second oil cylinder 2 having the second piston rod arranged thereon and a side of the third oil cylinder 3 having the third piston rod arranged thereon respectively are provided within the testing chamber. The testing device further includes a shear loading unit including a fourth oil cylinder 4 and a fifth oil cylinder 5. The fourth oil cylinder 4 and the fifth oil cylinder 5 are located on a same axis, and one side of the fourth oil cylinder 4 having a fourth piston rod provided thereon is arranged opposite to one side of the fifth oil cylinder 5 having a fifth piston rod provided thereon. The piston rods of the fourth oil cylinder 4 and the fifth oil cylinder 5 stretch or retract along the X direction, Y direction or Z direction.

The testing chamber includes a fixed seat 11 and a test specimen carrier 12 for loading a cuboid test specimen. The whole fixed seat 11 is of a hexahedral structure. A space for containing the test specimen carrier 12 is formed inside the fixed seat 11. An inlet-outlet opening for entrance and exit of the test specimen carrier 12 is formed on one surface of the fixed seat 11. The first oil cylinder 1 is arranged on the test specimen carrier 12 and located at one end of the test specimen in its length direction. The second oil cylinder 2, the third oil cylinder 3, the fourth oil cylinder 4, the fifth oil cylinder 5, the first reaction seat 6, the second reaction seat 7 and the third reaction seat 8 are all arranged on the fixed seat 11. The axes of the fourth oil cylinder 4 and the fifth oil cylinder 5 is along the Z direction, and the shear loading unit formed by the fourth oil cylinder 4 and the fifth oil cylinder 5 is arranged in parallel with the third oil cylinder 3. Two second oil cylinder 2 and two second reaction seat 7 are provided, and the six surfaces of the test specimen are covered with pressure bearing plates 9 respectively.

Two first guide rails 14 arranged in parallel for moving the test specimen carrier 12 are provided outside the inlet-outlet opening, and supported and fixed by a support frame 17.

The test specimen carrier 12 is of hexahedral structure. A test specimen loading space for accommodating the test specimen is arranged through the test specimen carrier 12. One surface of the test specimen carrier 12 is provided with a loading and unloading opening for loading and unloading test specimens, and the loading and unloading opening is arranged horizontally. The first oil cylinder 1 is arranged on a side wall of the test specimen loading space far from the fixed seat 11. Upper and lower side walls of the test specimen loading space are provided with through slots, and cushion blocks 10 for transferring the loading load or reaction force are slidably fitted in the through slots.

The test specimen is loaded on the test specimen carrier 12 through a test specimen preparation platform 15, and two second guide rails 18 arranged parallel for movement of the test specimen preparation platform 12 are provided on the test specimen carrier 12. Extension guide rails 16 are provided outside the loading and unloading opening; the extension guide rails 16 form extension portions of the second guide rails 18 and are arranged on a loading platform.

The loading platform includes a test specimen preparation platform base 13 which is provided with four columns Each extension guide rail 16 is fixed on two columns by two semicircular hoops and screws. The test specimen preparation platform 15 is of "H" shaped frame structure, and two hollow areas of the test specimen preparation platform 15 form an avoidance space for avoiding the cushion blocks 10. A pressure bearing plate 9 is arranged between the test specimen preparation platform 15 and the test specimen.

The piston rods of the first oil cylinder 1, the second oil cylinder 2, the third oil cylinder 3, the fourth oil cylinder 4 and the fifth oil cylinder 5 are provided with stress sensors and displacement sensors.

The testing device also includes a monitoring system for detecting cracks in the test specimen. The monitoring system includes an ultrasonic detection system, a thermal imaging detection system, an electromagnetic radiation detection system, a high-speed camera, a borehole imager and a dynamic strain gauge.

An embodiment of the present disclosure provides a testing method for simulating coalbump with the above testing device. The testing method includes the following steps:

S1, loading a test specimen: a prepared cuboid test specimen is placed on the test specimen preparation platform 15, the test specimen preparation platform 15 is driven along the extension guide rails 16 to enter the test specimen carrier 12 until the pressure bearing plate 9 on the test specimen preparation platform 15 is aligned with the underlying cushion block 10, and then the test specimen carrier 12 is driven along the first guide rails 14 to enter the fixed seat 11 until it contacts the first reaction seat 6;

S2, preliminary loading: the first oil cylinder 1, the second oil cylinder 2, the third oil cylinder 3, the fourth oil cylinder 4 and the fifth oil cylinder 5 are synchronously loaded to a first loading force (the loading force is enough to make the pressure bearing plate contact tightly the test specimen), so as to clamp the test specimen together with the first reaction seat 6, the second reaction seat 7 and the third reaction seat 8;

S3, fixing the test specimen: all the oil cylinders along the direction of the piston rod of the fourth oil cylinder 4 are further synchronously loaded to a second loading force (the second loading force is greater than the first loading force in S2 and less than the target preloading forces in S4), so as to further stabilize the test specimen;

S4, preloading: on the premise that the first target preloading forces of the fourth oil cylinder 4 and the fifth oil cylinder 5 are less than second target preloading forces of the first oil cylinder 1, the second oil cylinder 2 and the third oil cylinder 3, the above oil cylinders are loaded synchronously to respective target preloading forces (the target preloading force is determined according to the working conditions required to be simulated);

S5, keeping pressure stable: after each oil cylinder reaches its target preloading force, the state of stable pressure is kept for a period of time;

S6, shearing test: the second target preloading forces of the first oil cylinder 1, the second oil cylinder 2 and the third oil cylinder 3 are kept stable, and the piston rods of the fourth oil cylinder 4 and the fifth oil cylinder 5 are controlled to move in the same direction synchronously until the test specimen cracks;

S7, unloading and taking the test specimen: the first oil cylinder 1, the second oil cylinder 2, the third oil cylinder 3, the fourth oil cylinder 4 and the fifth oil cylinder 5 are unloaded at a certain rate until there is no loading force, and the test specimen carrier 12 is driven along the first guide rails 11 to exit the fixed seat 11, and the test specimen is taken out.

In the present disclosure employing the above technical solutions, by newly providing a pair of coaxial oil cylinders on the basis of the existing testing device, on the premise that the loading force applied on the test specimen by other oil cylinders is kept stable, the piston rods of the newly provided pair of oil cylinders are controlled to clamp the test specimen and move in the same direction synchronously, so as to produce shear force on the test specimen. Compared with the problem that the existing testing device for simulating coalbump cannot generate shearing force on the test specimen so that the physical simulation test of coalbump cannot be carried out under the condition of disturbed shear dynamic load caused by fault dislocation, in the present disclosure, the shearing force can be generated on the test specimen so that the physical simulation test of coalbump can be carried out under the condition of disturbed shear dynamic load caused by fault dislocation. Furthermore, it is convenient and quick to load materials through the test specimen preparation platform and the test specimen carrier, saving manpower.

The above is only a preferred embodiment of the present disclosure, and does not limit the present disclosure. Any modification, equivalent replacement and improvement made within the spirit and principles of the present disclosure should be included in the protection scope of the present disclosure.

What is claimed is:

1. A testing device for simulating coalbump, comprising a testing chamber, wherein a first oil cylinder, a second oil cylinder and a third oil cylinder are provided within the testing chamber; a first piston rod of the first oil cylinder, a second piston rod of the second oil cylinder and a third piston rod of the third oil cylinder stretch or retract respectively in an X direction, a Y direction and a Z direction; the testing chamber is also provided therein with a first reaction seat, a second reaction seat and a third reaction seat, which are arranged opposite to a side of the first oil cylinder having the first piston rod arranged thereon, a side of the second piston rod having the second oil cylinder arranged thereon and a side of the third piston rod having the third oil cylinder arranged thereon, respectively; the testing device further comprises a shear loading unit comprising a fourth oil cylinder and a fifth oil cylinder; the fourth oil cylinder and the fifth oil cylinder are located on a same axis, and a side of the fourth oil cylinder (4) having a fourth piston rod arranged thereon and a side of the fifth oil cylinder having a fifth piston rod arranged thereon are arranged opposite to each other; the fourth piston rod of the fourth oil cylinder and the fifth piston rod of the fifth oil cylinder stretch or retract along the Z direction;

wherein the testing chamber comprises a fixed seat and a test specimen carrier for loading a cuboid test specimen, the fixed seat is of hexahedral structure, a space for accommodating the test specimen carrier is formed inside the fixed seat, and an inlet-outlet opening for entrance and exit of the test specimen carrier is formed on a surface of the fixed seat; the first oil cylinder is arranged on the test specimen carrier and located at an end of the test specimen in its length direction; the second oil cylinder, the third oil cylinder, the fourth oil cylinder, the fifth oil cylinder, the first reaction seat, the second reaction seat and the third reaction seat are all arranged on the fixed seat; the axis of the fourth oil cylinder and the fifth oil cylinder is along the Z direction, and the shear loading unit formed by the fourth oil cylinder and the fifth oil cylinder is arranged in parallel with the third oil cylinder; two second oil cylinders are provided and two second reaction seats are provided, and six surfaces of the test specimen are covered with pressure bearing plates respectively; and wherein two first guide rails arranged in parallel for movement of the test specimen carrier are provided outside the inlet-outlet opening, and the two first guide rails are supported and fixed by a support frame;

wherein the test specimen carrier is of hexahedral structure, a test specimen loading space for accommodating the test specimen is provided through the test specimen carrier, a loading and unloading opening for loading and unloading the test specimen is provided on a surface of the test specimen carrier and arranged horizontally; the first oil cylinder is arranged on a side wall of the test specimen loading space far from the fixed seat; upper and lower side walls of the test specimen loading space are provided with through slots, and cushion blocks for transferring loading load or reaction force are slidably fitted in the through slots.

2. The testing device according to claim 1, wherein the test specimen is loaded on the test specimen carrier through a test specimen preparation platform, and the test specimen carrier is provided with two second guide rails arranged in parallel for moving the test specimen preparation platform; extension guide rails are provided outside the loading and unloading opening and form extension portions of the second guide rails, the extension guide rails are provided on a loading platform.

3. The testing device according to claim 2, wherein the loading platform comprises a test specimen preparation platform base, and four columns are provided on the test specimen preparation platform base; each of the extension guide rails is fixed on two corresponding columns by two semicircular hoops and screws; the test specimen preparation platform is of "日" shaped frame structure, and two hollow areas of the test specimen preparation platform form avoidance space for avoiding collision with the cushion blocks; a pressure bearing plate is arranged between the test specimen preparation platform and the test specimen.

4. The testing device according to claim 1, wherein each of piston rods of the first oil cylinder, the second oil cylinder, the third oil cylinder, the fourth oil cylinder and the fifth oil cylinder is provided with a stress sensor and a displacement sensor.

5. The testing device according to claim 1, wherein the testing device further comprises a monitoring system for detecting cracks in the test specimen, and the monitoring system comprises an ultrasonic detection system, a thermal imaging detection system, an electromagnetic radiation detection system, a high-speed camera, a borehole imager, and a dynamic strain gauge.

\* \* \* \* \*